United States Patent
Aizikowitz et al.

(10) Patent No.: US 10,180,815 B1
(45) Date of Patent: Jan. 15, 2019

(54) SYSTEMS AND METHODS FOR VARIABLE DATA PRINTING

(71) Applicant: XMPie (Israel) Ltd., Netanya (IL)

(72) Inventors: Jacob Aizikowitz, Haifa (IL); Zvika Leybovich, Petach Tikva (IL); Hanan Weisman, Givat Ad (IL); Hadas Groisman, Netanya (IL); Amit Cohen, Herzeliya (IL)

(73) Assignee: XMPIE (ISRAEL) LTD., Netanya (IL)

( * ) Notice: Subject to any disclaimer, the term of this patent is extended or adjusted under 35 U.S.C. 154(b) by 0 days.

(21) Appl. No.: 15/697,039

(22) Filed: Sep. 6, 2017

(51) Int. Cl.
*G06F 3/12* (2006.01)

(52) U.S. Cl.
CPC .......... *G06F 3/1243* (2013.01); *G06F 3/1215* (2013.01); *G06F 3/1241* (2013.01)

(58) Field of Classification Search
USPC ................................................ 358/1.1–3.29
See application file for complete search history.

(56) References Cited

U.S. PATENT DOCUMENTS

| | | | |
|---|---|---|---|
| 6,919,967 B1 * | 7/2005 | Pentecost | G06F 17/212 235/375 |
| 6,948,115 B2 | 9/2005 | Aizikowitz | |
| 7,406,194 B2 | 7/2008 | Aizikowitz | |
| 7,548,338 B2 | 6/2009 | Cohen et al. | |
| 7,757,169 B2 | 7/2010 | Aizikowitz | |
| 2001/0047369 A1 * | 11/2001 | Aizikowitz | G06F 17/21 715/205 |
| 2003/0076535 A1 * | 4/2003 | Prosi | G06K 15/00 358/1.16 |
| 2011/0255124 A1 * | 10/2011 | Klassen | G06F 3/121 358/1.15 |
| 2018/0082159 A1 * | 3/2018 | Torii | G06F 3/1213 |

* cited by examiner

*Primary Examiner* — Marcellus Augustin
(74) *Attorney, Agent, or Firm* — Pearl Cohen Zedek Latzer Baratz LLP (57) ABSTRACT

Systems and method for variable data printing are provided. A composition system can receive a variable data printing job and can determine a plurality of subjobs. The composition system can determine a plurality of variable data print streams are determined. The composition system can transmit the plurality of variable data print streams and an indicator to expect a transmission of the plurality of variable data printing streams. The RIP can be configured to receive the indicator and the plurality of variable data printing streams.

6 Claims, 5 Drawing Sheets

SYSTEMS AND METHODS FOR VARIABLE DATA PRINTING

FIELD OF THE INVENTION

The invention relates generally to variable data printing. In particular to interfaces and communication between various parts of variable data printing systems.

BACKGROUND OF THE INVENTION

Currently, variable data printing can be used to print batches of documents where one or more sections of the documents can vary. For example, advertising documents can be personalized with the particular recipient's name. Variable data printing can be used for both printed documents (e.g., documents printed on paper) and digital documents (e.g. in PDF format).

The process of variable data printing can include creation, production and rendering. The creation can include planning, design, programming and/or authoring. Production can include generating target media formats for a particular set of documents. Rendering can include printing on paper or printing (e.g., presenting) the content on a display monitor.

Variable data printing systems can include a composition system and a raster image processor (RIP). Typically, composition systems can receive a variable data printing job for printing. The composition system can process the variable data printing job to, for example, receive a design template, typically from a desktop Design Tool such as Adobe InDesign, with various static and dynamic elements in it, receive data of many different recipients (records) and receive a set of rules which applies to these recipients; then compose elements of the design template based on their graphical attributes, the recipient data and the rules.

The composition system typically divides the variable data printing job into sub-jobs, processes each sub-job, merges all sub-jobs into a merged variable data printing stream. The merged variable data printing stream is typically a stream of pages to print that reflects an order of recipients as specified in the variable data print job. The composition system, after merging, typically transmits the merged variable data printing stream to the RIP. When the RIP receives the data stream, it converts the stream to ready to print page buffers and can transmit the ready to print page buffers to a print engine to generate printed pages. This process can be inefficient because although each of the sub-jobs can be processed concurrently, the composition system typically waits until all the sub-jobs are processed and merged before transmitting the merged job to the RIP. This can add unwanted delay to the time it takes to print a variable data printing job.

SUMMARY OF THE INVENTION

One advantage of the invention is in reducing the time it takes to compose variable data printing jobs. The time reduction can be due to, for example, having a composition system and a RIP that process the same job with a larger time overlap. This can occur by allowing the RIP to start its process upon the completion of the first sub-job and not waiting for all the sub-jobs to complete their composition. The time reduction can also be due to, for example, eliminating a merge step by having the RIP handle each sub-stream independently.

In one aspect, the invention includes a system for variable data printing. The system includes a composition system configured to receive a variable data printing job J, and determine a plurality of sub-jobs $J_n$ based on the variable data printing job J, where n is the number of sub-jobs. The composition system is also configured to determine a plurality of variable data printing streams $V_n$ based on the plurality of sub-jobs $J_n$ and transmit to a raster image processor (RIP) an indicator to expect a transmission of the plurality of variable data printing streams $V_n$. The composition system is also configured to for each of the plurality of variable data printing streams $V_i$, where i=1 . . . n, transmit the variable data printing stream $V_i$ to the RIP in real-time once determined and after the indicator is transmitted. The system also includes the RIP, coupled to the composition system, the RIP configured to receive the indicator and the plurality of variable data printing streams $V_i$.

In some embodiments, the RIP is further configured to merge the plurality of variable data printing streams $V_n$, creating a merged variable data printing stream V, and process the merged variable data printing stream to create information and commands that a print engine needs in order to render the merged variable data printing stream V into printed pages.

In some embodiments, the RIP is configured to for each $V_i$, i) identify one or more reusable elements $e_i^k$ where k is the k'th element in $V_i$, and ii) determine for each of the one or more identified reusable elements $e_i^k$ whether it is unique and if it is unique, render the unique element $e_i^k$ to a ready to print format $e_i^{k_1}$, where $e_i^{k_1}$ is the ready to print format for each corresponding $e_i^k$, and merging the modified plurality of variable data printing streams $V_n$, and render the merged modified plurality of variable data printing streams.

In some embodiments, the composition system is further configured to determine one or more reusable elements $e_i^k$ where k is the k'th element in $V_i$, and transmit the determined reusable elements $e_i^k$ to the RIP in real time upon their identification, and wherein the RIP is further configured to: i) render each of the one or more reusable elements $e_i^k$ to a ready to print format $e_i^{k_1}$, or rendering some of the one or more reusable elements $e_i^k$ to a ready to print format based on whether or not the particular reusable element was previously rendered; ii) determine that all of the plurality of variable data printing streams $V_n$, are received; iii) merging the plurality of variable data printing streams $V_n$, and iv) render the merged modified plurality of variable data printing streams.

In some embodiments, the composition system is further configured to determine one or more reusable elements $e_i^k$ where k is the k'th element in $V_i$, and wherein the RIP is further configured to: i) render each of the one or more reusable elements that is unique to a ready to print format $e_i^{k_1}$, ii) store the rendered one or more reusable elements $e_i^{k_1}$ in a cache, and iii) render each of the plurality of variable data printing streams.

In another aspect, the invention includes a composition system for variable data printing, the composition system configured to receive a variable data printing job J, and determine a plurality of sub-jobs $J_n$ based on the variable data printing job J, where n is the number of sub-jobs. The composition system is also configured to determine a plurality of variable data printing streams $V_n$ based on the plurality of sub-jobs $J_n$, and transmit to a raster image processor (RIP) an indicator to expect a transmission of the plurality of variable data printing streams $V_n$. The composition system is also configured to for each of the plurality of variable data printing streams $V_i$, where i=1 . . . n, transmit the variable data printing stream $V_i$ to the RIP in real-time once determined and after the indicator is transmitted.

In some embodiments, the indicator includes n for the plurality of sub-jobs $J_n$. In some embodiments, the composition system is further configured to for each $V_i$, determining, by the computing device, one or more reusable elements $e_i^k$ where k is the k'th element in $V_i$, and for each of the one or more reusable elements $e_i^k$ transmit, by the computing device, the one or more reusable elements $e_i^k$ to the RIP in real-time once determined.

In another aspect, the invention includes a raster image processor (RIP) for variable data printing. The RIP is configured to receive an indicator to expect transmission of a plurality of data printing streams $V_n$ where n is number of variable data printing streams and determine for each of the plurality of data printing streams, one or more reusable elements $e_i^k$ where k is the k'th element in each respective $V_i$, where i=1 . . . n. The RIP is also configured to render each of the one or more reusable elements $e_i^k$, in a ready to print format $e_i^{k'}$ where $e_i^{k'}$ is the ready to print format for each corresponding $e_i^k$, and render each of the plurality of data printing streams $V_i$ in order from 1 to n, after receiving a minimum number of variable data printing streams.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

Figure 1:
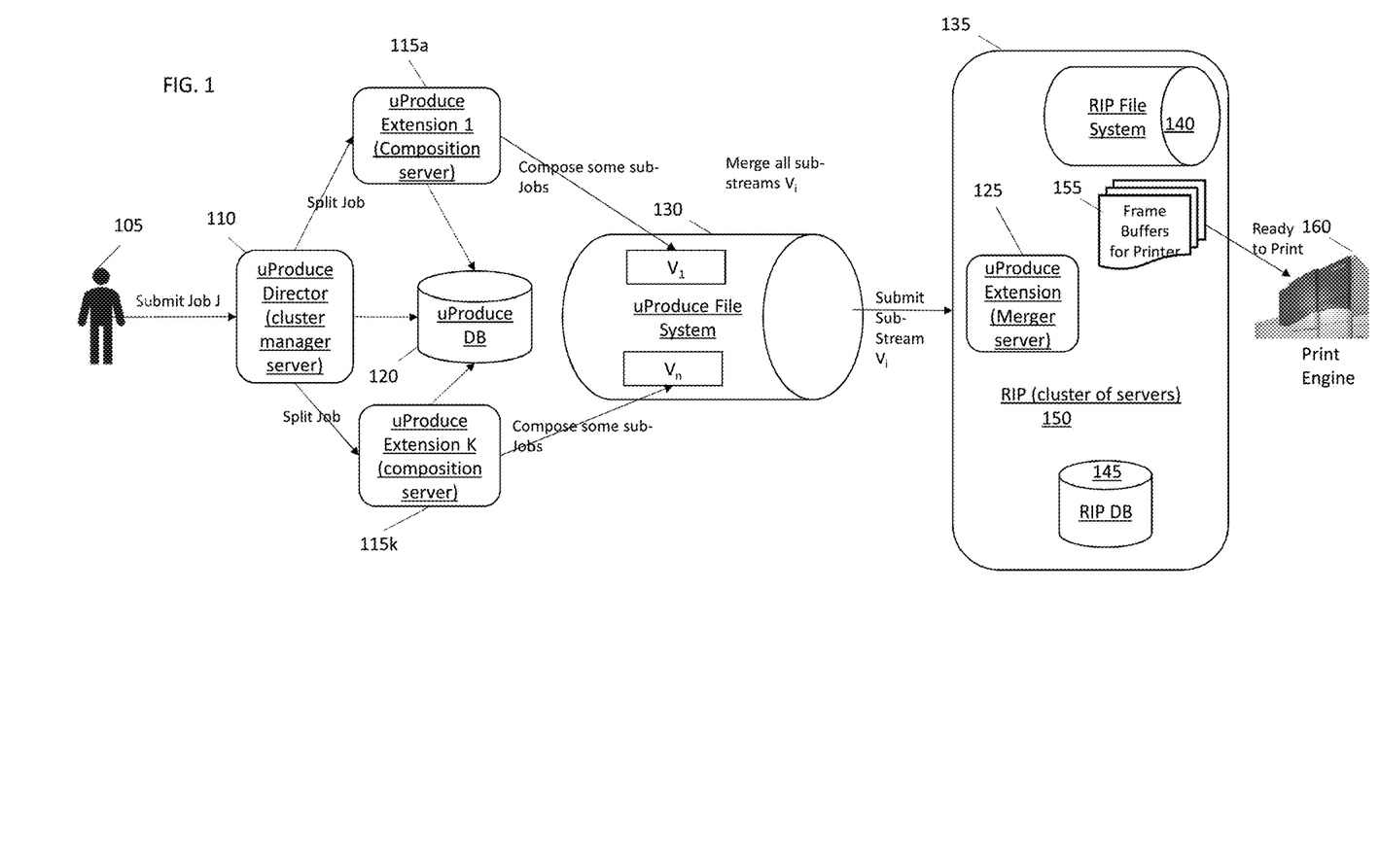
FIG. 1 is a diagram of a system for variable data printing, according to an illustrative embodiment of the invention.

FIG. 1 is a diagram of a system for variable data printing, according to an illustrative embodiment of the invention. The system includes an operator 105, a composition cluster manager server 110, one or more composition servers 115a, 115b, . . . 115k, generally 115, a composition database 120, a composition file system 130, a Raster Image Processor (RIP) 135, and a print engine 160.

The RIP 135 can include, a RIP file system 140, a RIP database 145, and one or more RIP processing servers 150a, 150b, . . . 150l, generally 150.

During operation, the cluster manager server 110 receives a job from an operator 105. IN some embodiments, the cluster manager server 110 receives the job from an application interface (API). The cluster manager server 110 can split the job into n sub-jobs, and send each sub-job to a respective composition server 115. In some embodiments, the number of composition servers 115 is smaller than the number of sub-jobs such that each extension may perform more than 1 sub-job. Each composition server 115, receiving a sub-job $J_i$, can composes it into a corresponding variable data printing sub-stream $V_i$ and store it in the file system 130. Each composition server 115 can transmit each corresponding variable data printing sub-stream $V_i$ to the RIP 135.

The RIP 135 can merge via the processing servers 150 all of the variable printing data stream sub-streams $V_i$ into one merged variable data printing stream V. The merged variable data printing stream can be stored in the RIP file system 140 and/or stored in the RIP database 145. The RIP can, via the processing servers 150, identify and render one or more reusable elements in each of the variable printing data stream sub-streams $V_i$ and store the rendered one or more reusable elements in the RIP database 145. Prior to rendering each of the one or more reusable elements, the RIP, via the processing servers 150, can identify and refrain from rendering reusable elements that are already in the RIP database 145 to, for example, avoid rendering the same reusable element multiple times.

The RIP, via the processing servers 150, can create Ready to Print frame buffers 155. The RIP can transmit the Ready to Print frame buffers 155 to the print engine 160.

As is apparent to one of ordinary skill in the art, each server, database, and/or file system in the system can be implemented on its own computing device, a single computing device, or a combination of computing devices. The communication between the elements of the system can be wired and/or wireless.

Figure 2:
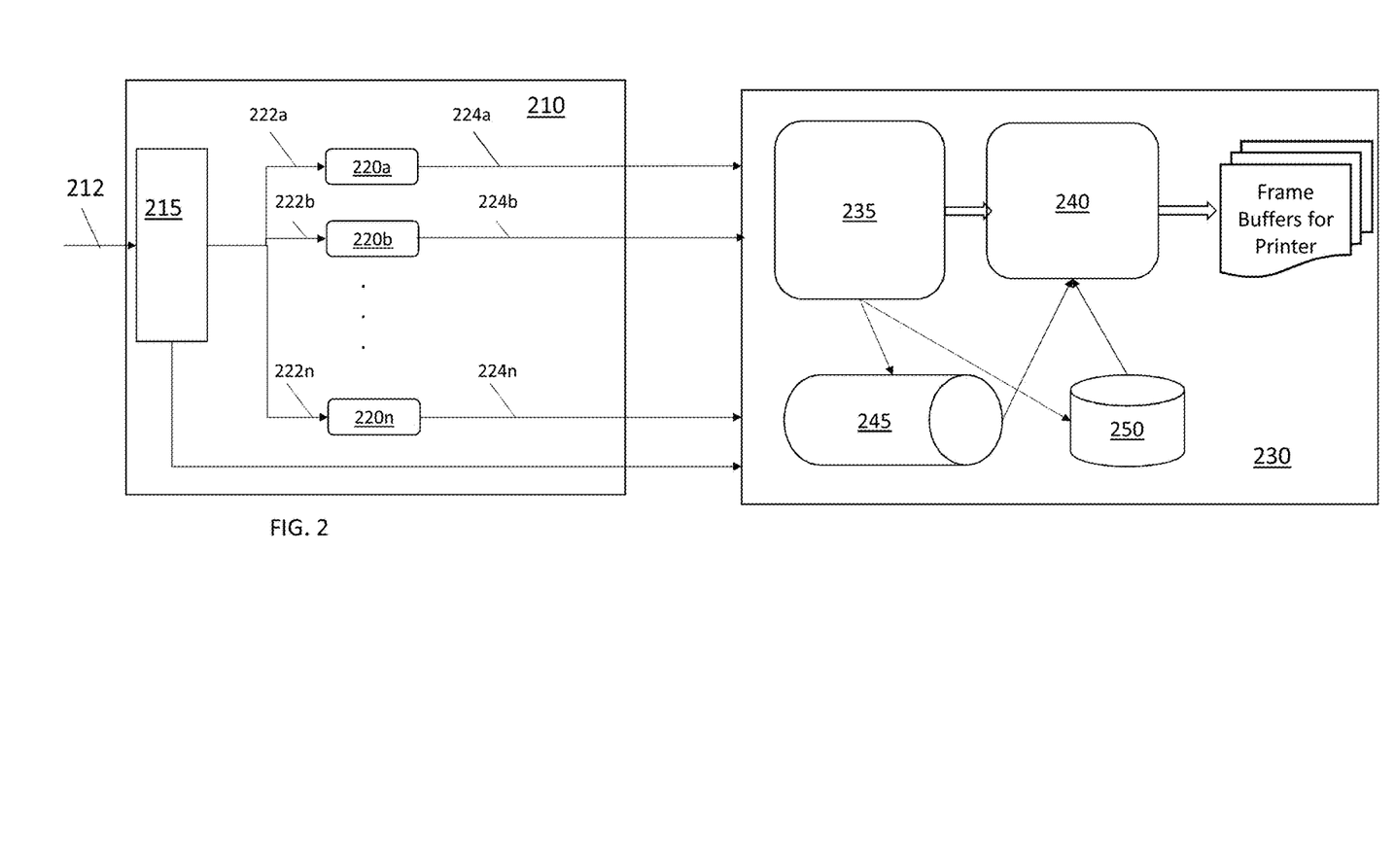
FIG. 2 is a schematic block diagram of a variable data printing system, according to an illustrative embodiment of the invention.

FIG. 2 is a schematic block diagram of a variable data printing system 200, according to an illustrative embodiment of the invention. The variable data printing system 200 can include a composition system 210 and a raster image processor (RIP) 230. The composition system 210 can be coupled to the RIP 230. The composition system 210 can be electrically coupled and/or wirelessly coupled to the RIP 230. The composition system 210 can transmit data to the RIP 230.

The composition system 210 can include a parts generator module 215. The parts generator module 215 can receive a variable data printing job J input 212. The parts generator module 215 can split the variable data printing job J into two or more sub-jobs $J_n$ 222a, 222b, . . . , 222n, generally 222, where n is the number of sub-jobs. The parts generator module 215 can split the variable data printing job J as is shown in U.S. Pat. No. 7,406,194 B2, incorporate herein by reference in its entirety.

The parts generator module 215 can launch a pipeline 220a, 220b, . . . , 220n, generally 220 for each sub-job $J_n$. The pipelines 220 can operate in parallel. The pipelines 220 can generate information that can be used in printing (e.g., booklet sections, definition dictionaries, and/or other information as is known in the art). The pipelines 220 can each output a respective variable data printing sub-stream $V_i$, where i=1 to n, 224a, 224b, . . . , 224n, generally 224. In some embodiments, there is a one-to-one mapping between the number of sub-jobs and the number of variable data printing sub-streams. For example, if there are 100 sub-jobs, there can be 100 variable data printing sub-streams.

The composition system 210 can be coupled to the RIP 230. The parts generator module 215 can transmit an indicator to the RIP 230 to expect to receive the variable data printing sub-streams $V_i$ 224. The indicator can include the number of variable data printing sub-streams, n. In some embodiments, the indicator is embedded within the first variable data printing sub-stream $V_1$ 224a that is transmitted to the RIP 230.

Each of the variable data printing sub-streams 224 can be transmitted by the composition system 210 to the RIP 230 as soon as it is available (e.g., as soon as its respective pipeline 220 has produced it). For example, assume a variable data sub-streams $V_1$ through $V_{200}$. Also assume that $V_1$, $V_{12}$, $V_{101}$, $V_{195}$, all complete processing in its respective pipeline 220 at the same time and before all of the other variable data printing sub-streams. In this example, $V_1$, $V_{12}$, $V_{101}$, $V_{195}$ can all be transmitted to the RIP 230 as soon as they are completed.

In some embodiments, each of the variable data printing sub-streams are transmitted to the RIP 230 with an indicator of its order with respect to the other sub-streams.

The RIP 230 can include a pre-processor module 235, a stream to ready to print module 240, a memory 245 for storing one or more modified variable data printing streams and cache 250 for storing ready to print elements. In various embodiments, the pre-processor module 235, the stream to ready to print module 240, the memory 245, the cache 250, are implemented on the same computing device, different computing devices, or any combination of computing devices is known in the art.

The RIP 230 can receive the variable data printing sub-streams $V_i$ 224. Each of the variable data printing sub-streams $V_i$ 224 can be processed through a pre-processing module 235. The pre-processing module 235 can identify one or more reusable elements $e_i^k$ in each of the variable data printing sub-streams $V_i$, where k is the kth element in $V_i$. For each of the one or more reusable elements $e_i^k$ identified, the pre-processing module 235 can determine whether the particular reusable element has been previously rendered. In this manner, a unique set of reusable elements for a given job J can be determined.

The one or more reusable elements $e_i^k$ in each of the variable data printing sub-streams $V_i$, can be processed (e.g., rendered) by the pre-processing module 235 into a ready-to-print format and stored in cache 250. In some embodiments, the unique set of reusable elements for a given job J are the only reusable elements that are rendered. In this manner, the RIP can save time on rendering by rendering a minimum number of elements.

The pre-processing module 235 can transmit the modified sub-streams to the ready to print module 240. The ready to print module 240 can receive the modified variable data printing sub-streams $V_i$, process (e.g., render) the modified variable data printing sub-streams $V_i$ into a ready-to-print format, pulling the one or more reusable elements $e_i^k$ from the cache 250 as they are referred to in each respective modified variable data sub-stream. In this manner, the RIP 230 can avoid having to render each reusable element multiple times.

In some embodiments, the pre-processing module 235 can merge the modified variable data printing sub-streams before processing (e.g., rendering) with the stream to ready to print module 240.

Figure 3:
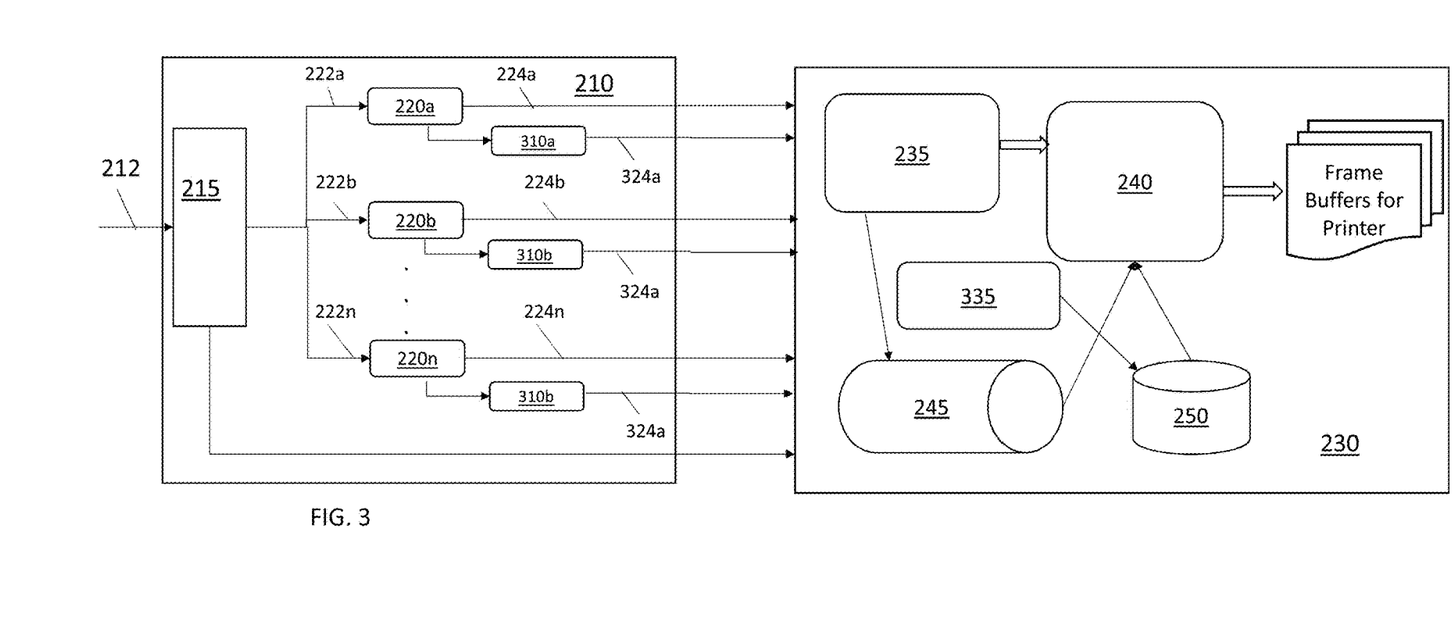
FIG. 3 is a schematic block diagram of a variable data printing system, according to an illustrative embodiment of the invention.

In some embodiments, the one or more reusable elements $e_i^k$ are determined by the composition system 210 and rendered to a ready-to-print format by the RIP 230. FIG. 3 is a schematic block diagram of a variable data printing system, according to an illustrative embodiment of the invention, where the one or more reusable elements $e_i^k$ are determined by the composition system 210 and rendered to a ready-to-print format by the RIP 230. In particular, FIG. 3 shows that each of the pipelines 220 processing respective variable data printing streams $V_i$ can each include corresponding portions (e.g., definitions dictionaries) 310a, 310b, . . . 310n, generally 310, that can receive each respective variable data printing stream $V_i$ 224, and can identify one or more reusable elements $e_i^k$ in its respective variable data printing stream $V_i$. When each of the one or more reusable elements $e_i^k$ is identified, it can be transmitted to the RIP 230. In various embodiments, the one or more reusable elements $e_i^k$ are each transmitted before its respective variable data printing stream, at the same time as its respective variable data stream, or after its respective variable data printing stream.

The RIP 230 can receive the one or more reusable elements $e_i^k$ and pre-process them to ready-to-print elements (e.g., generate a bit map) via a reusable element pre-process module 335. The reusable element pre-process module 335 can store the ready-to-print reusable elements in the cache 250. In this embodiment, the pre-processing module 235 does not identify the one or more reusable elements $e_i^k$, as they were identified by the composition system 210.

Figure 4A:
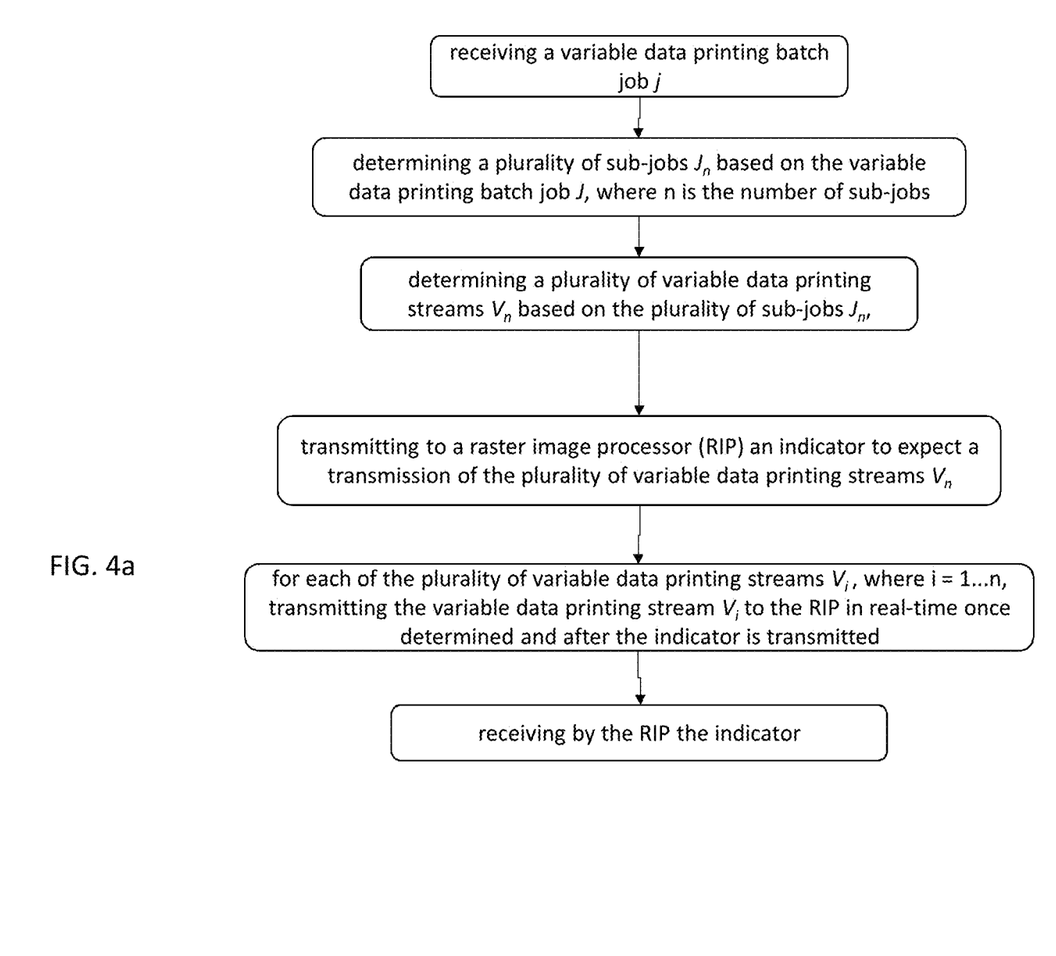
FIGS. 4a and 4b are flowcharts of a method for variable data printing, according to an illustrative embodiment of the invention.
Figure 4B:
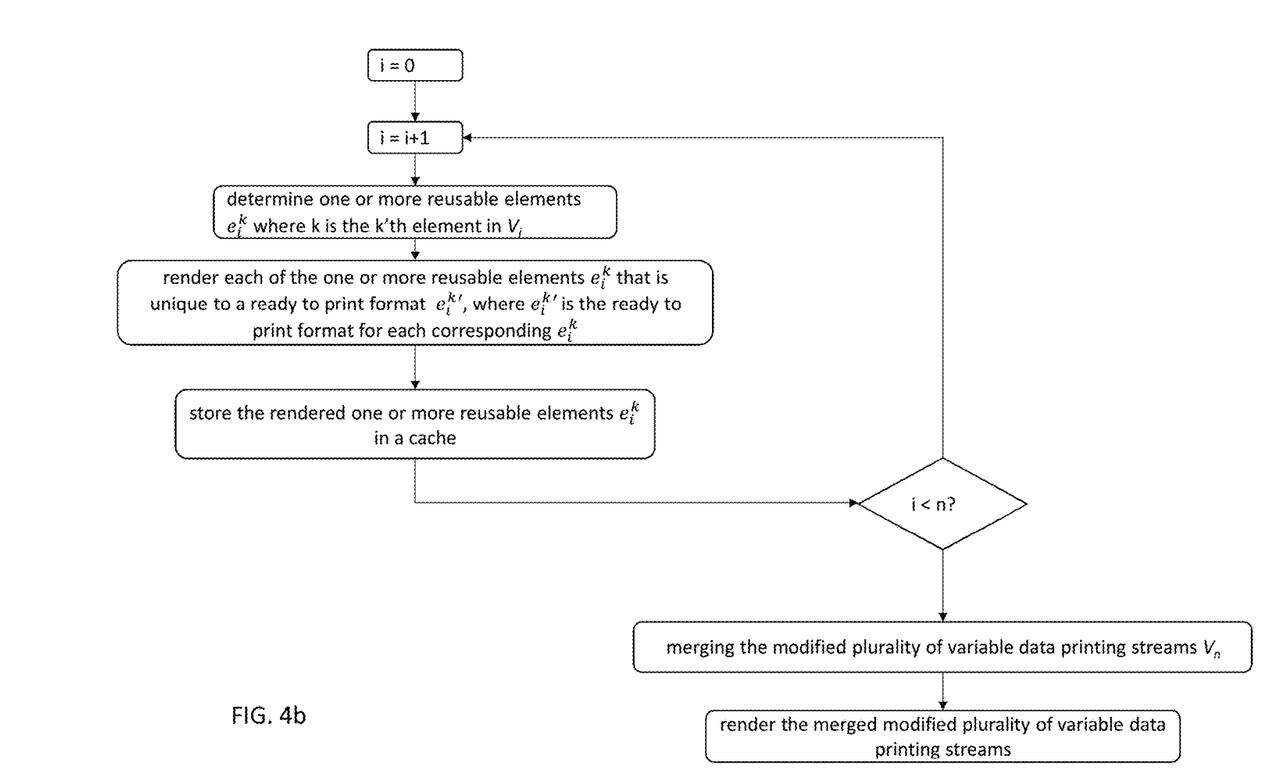

FIGS. 4a and 4b are flowcharts of a method for variable data printing, according to an illustrative embodiment of the invention. The method involves receiving (e.g., by the composition system 210, as described above) a variable data printing job J (Step 405). The variable data printing job can be any printing job that can require elements that are the same and elements that vary over the course of printing. For example, direct mail newsletter and/or a personalized message from an organization to its employees. The method also involves determining (e.g., by the parts generator module 215, as described above) a plurality of sub-jobs $J_n$ based on the variable data printing job J, where n is the number of sub-jobs (Step 410). The variable data printing job J can be split as is shown in U.S. Pat. No. 7,406,194, which is incorporated herein by reference it its entirety, and/or as is known in the art.

The method can also involve determining (e.g., by the composition system 210, as described above) a plurality of variable data printing streams $V_n$ based on the plurality of sub-jobs $J_n$. (Step 415). Determining the plurality of variable data printing streams can include adding information not in the plurality of sub-jobs $J_n$, as is known in the art. For example, booklet sections, definition dictionaries, and/or other information as is known in the art.

The method can also include transmitting (e.g., by the composition system 210, as described above) to a raster image processor (RIP) an indicator to expect a transmission of the plurality of variable data printing streams $V_n$ (Step 420). The indicator can include the number of variable data printing streams. In some embodiments, the indicator can include information that indicates whether sub-jobs and reusable elements are being transmitted, and the order of that transmission.

The method can also involve for each of the plurality of variable data printing streams $V_i$, where i=1 . . . n, transmitting (e.g., by the composition system 210, as described above) the variable data printing stream $V_i$ to the RIP in real-time once determined and after the indicator is transmitted (Step 425).

The method can also involve receiving the indicator by the RIP (e.g., the RIP 230, as described above) (Step 430).

The method can also involve, for each of the plurality of variable data printing streams $V_i$, where i=1 . . . n performing steps 435, 440, 445, 450, 455 and 460 (e.g., by the RIP 230, as described above). For example, i can be set to zero (Step 433), and incremented by 1 (Step 435), then for $V_i$, the method can involve determining one or more reusable elements $e_i^k$ where k is the k'th element in $V_i$ (Step 440). The method can involve rendering each of the one or more reusable elements $e_i^k$ that is unique to a ready to print format $e_i^{k1}$, where $e_i^{k1}$ is the ready to print format for each corresponding $e_i^k$ (Step 445). The method can involve storing the rendered one or more reusable elements $e_i^k$ in a cache (e.g., cache 250, as described above) (Step 450). The method can involve determining if the last variable data printing stream $V_i$ has been considered, by for example, checking if "i" is less n (Step 460). If "i" is less then n, then continue to step 435. Otherwise, the method can involve merging the modified plurality of variable data printing streams $V_n$ (Step 465). The method can also involve rendering the merged modified plurality of variable data printing streams (Step 470).

In various embodiments, determining the one or more reusable elements is done prior to transmission to the RIP (e.g., via the composition system 210, as described above).

In some embodiments, the RIP merges the variable data printing streams $V_n$ upon receipt and renders the variable data printing stream $V_n$.

In some embodiments, the RIP does not merge the modified variable data printing streams $V_n$ prior to rendering, and directly renders each of the modified variable data printing stream $V_n$.

The above-described methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device.

Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes. Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A system for variable data printing, the system comprising:
 a composition system configured to:
  receive a variable data printing job J,
   splitting the variable data printing job J into a plurality of sub-jobs $J_n$, where n is the number of sub-jobs,
   determine a plurality of variable data printing streams $V_n$ based on the plurality of sub-jobs $J_n$,
   transmit to a raster image processor (RIP) an indicator to expect a transmission of the plurality of variable data printing streams $V_n$,
   for each of the plurality of variable data printing streams $V_i$, where i=1 . . . n, transmit the variable data printing stream $V_i$ to the RIP in real-time once determined and after the indicator is transmitted; and
 the RIP, coupled to the composition system, the RIP configured to:
  receive the indicator and the plurality of variable data printing streams $V_i$
  merge the plurality of variable data printing streams $V_n$, creating a merged variable data printing stream V;
  process the merged variable data printing stream to create information and commands that a print engine needs in order to render the merged variable data printing stream V into printed pages;
  for each $V_i$,
   i) identify one or more reusable elements $e_i^k$ where k is the k'th element in $V_i$,
   ii) determine for each of the one or more identified reusable elements $e_i^k$ whether it is unique and if it is unique, render the unique element $e_i^k$ to a ready to print format $e_i^{k1}$, where $e_i^{k1}$ is the ready to print format for each corresponding $e_i^k$, and
  merging the modified plurality of variable data printing streams $V_n$; and
  render the merged modified plurality of variable data printing streams.

2. The system of claim 1 wherein:
 the composition system is further configured to determine one or more reusable elements $e_i^k$ where k is the k'th element in $V_i$, and transmit the determined reusable elements $e_i^k$ to the RIP in real time upon their identification, and wherein the RIP is further configured to:
  i) render each of the one or more reusable elements $e_i^k$ to a ready to print format $e_i^{k_1}$, or rendering some of the one or more reusable elements $e_i^k$ to a ready to print format based on whether or not the particular reusable element was previously rendered; and
  ii) determine that all of the plurality of variable data printing streams $V_n$, are received,
  iii) merging the plurality of variable data printing streams $V_n$, and
  iv) render the merged modified plurality of variable data printing streams.

3. The system of claim 1 wherein:

the composition system is further configured to determine one or more reusable elements $e_i^k$ where k is the k'th element in $V_i$, and wherein the RIP is further configured to:
  i) render each of the one or more reusable elements that is unique to a ready to print format $e_i^{k_1}$, and
  ii) store the rendered one or more reusable elements $e_i^{k_1}$ in a cache,
  iii) render each of the plurality of variable data printing streams.

4. A composition system for variable data printing, the composition system configured to:

receive a variable data printing job J;
  splitting the variable data printing job J into a plurality of sub-jobs $J_n$, where n is the number of sub-jobs;
  determine a plurality of variable data printing streams $V_n$ based on the plurality of sub-jobs $J_n$;
  transmit to a raster image processor (RIP) an indicator to expect a transmission of the plurality of variable data printing streams $V_n$; and
  for each of the plurality of variable data printing streams $V_i$, where i=1 . . . n, transmit the variable data printing stream $V_i$ to the RIP in real-time once determined and after the indicator is transmitted; and
  determine one or more reusable elements $e_i^k$ where k is the k'th element in $V_i$, and transmit the determined reusable elements $e_i^k$ to the RIP in real time upon their identification.

5. The composition system of claim 4 wherein the indicator includes n for the plurality of sub-jobs $J_n$.

6. The composition system of claim 4 further comprising:
  for each $V_i$, determining, by the computing device, one or more reusable elements $e_i^k$ where k is the k'th element in $V_i$;
  for each of the one or more reusable elements $e_i^k$ transmit, by the computing device, the one or more reusable elements $e_i^k$ to the RIP in real-time once determined.

* * * * *